(12) United States Patent
Eldredge

(10) Patent No.: US 9,970,741 B1
(45) Date of Patent: May 15, 2018

(54) CARTRIDGE CASE PREPARATION ROTOR DEVICE

(71) Applicant: Eric P. Eldredge, Fallon, NV (US)

(72) Inventor: Eric P. Eldredge, Fallon, NV (US)

( * ) Notice: Subject to any disclaimer, the term of this patent is extended or adjusted under 35 U.S.C. 154(b) by 0 days. days.

(21) Appl. No.: 15/722,142

(22) Filed: Oct. 2, 2017

(51) Int. Cl.
*B21K 21/04* (2006.01)
*F42B 33/10* (2006.01)
*B23B 5/16* (2006.01)
*F42B 35/02* (2006.01)

(52) U.S. Cl.
CPC .............. *F42B 33/10* (2013.01); *B23B 5/167* (2013.01); *F42B 35/02* (2013.01)

(58) Field of Classification Search
CPC .......... F42B 33/10; F42B 35/02; B23B 5/167; B23B 5/168
USPC .......................................................... 86/19.7
See application file for complete search history.

(56) References Cited

U.S. PATENT DOCUMENTS

| | | |
|---|---|---|
| 2,406,170 A | 8/1946 | Smiley |
| 2,744,307 A | 5/1956 | Smiley |
| 3,174,390 A | 3/1965 | Jacobsen |
| 3,199,168 A | 10/1965 | Rhine |
| 3,274,651 A | 9/1966 | Westbrook |
| 3,450,000 A * | 6/1969 | Ponsness .............. F42B 33/004 86/25 |
| 3,555,641 A | 1/1971 | Lee |
| 3,818,563 A | 6/1974 | Beaulieu |
| 4,178,189 A | 12/1979 | Mancini |
| 4,325,282 A | 4/1982 | Schaenzer |
| 4,405,269 A | 9/1983 | Hertzler |
| 4,468,829 A | 9/1984 | Christensen |
| 4,653,157 A | 3/1987 | Alexander |
| 4,686,751 A | 8/1987 | Gracey |
| 4,742,606 A | 5/1988 | Burby |
| 4,813,827 A | 3/1989 | Dugger |
| 4,860,453 A | 8/1989 | Carroll |
| 5,050,475 A | 9/1991 | Kolmer |
| 5,064,320 A | 11/1991 | Markle |
| 5,088,169 A * | 2/1992 | Touzet .................... B23B 5/168 86/19.7 |
| 5,301,436 A | 4/1994 | Johnston |
| 5,309,813 A | 5/1994 | Henley |
| 5,415,670 A | 5/1995 | Schmidt |
| 5,469,464 A * | 11/1995 | De Groote ............. H04L 25/06 375/317 |

(Continued)

FOREIGN PATENT DOCUMENTS

EP          0685703 A1 * 12/1995 ............. B23B 5/168

*Primary Examiner* — Gabriel Klein

(57) ABSTRACT

The cartridge case preparation rotor device trims cartridge cases to overall length correctly and further prepares them for reloading. The rotor holds multiple case preparation tools so that the user may conveniently and precisely apply them more squarely to a turning cartridge case. The rotor slides and turns on a rod mounted opposite a variable speed motor fitted with a chuck turning a case holder. Flexibility of the rod and oscillation of the rotor permit each tool to follow case eccentricity. An enlarged grip on the case holder simplifies installation and removal of cases. A neck cleaning tool cleans the inside and outside of the case neck simultaneously. The rotor may be slid along and turned upon the rod manually, or the motor and rotor can be mounted on a progressive press. The pushbutton control switch can be pressed by hand, or set on the floor as a foot switch.

6 Claims, 2 Drawing Sheets

(56) References Cited

U.S. PATENT DOCUMENTS

| | | |
|---|---|---|
| 5,497,939 A | 3/1996 | Blodgett |
| 5,718,423 A | 2/1998 | Blodgett |
| 5,788,429 A * | 8/1998 | Gracey ................... B23B 5/168 408/234 |
| 6,101,915 A | 8/2000 | Sinclair |
| 6,484,616 B1 | 11/2002 | Giraud |
| 7,155,789 B1 * | 1/2007 | Gracey ................... B23B 5/165 29/33 T |
| 7,650,825 B1 | 1/2010 | Lee |
| 8,408,112 B2 | 4/2013 | Keska |
| 9,022,704 B1 | 5/2015 | Goodman |
| 9,146,087 B2 | 9/2015 | Cottrell |
| 9,541,365 B2 | 1/2017 | Giraud |

\* cited by examiner

CARTRIDGE CASE PREPARATION ROTOR DEVICE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

This disclosure relates generally to a device for reconditioning used cartridge cases, and more particularly, to a device for trimming a resized brass cartridge case to length, chamfering and deburring the fresh cut, and cleaning the case neck to prepare the case for reloading.

Brass cartridge cases elongate with repeated firing and resizing, and when the overall length exceeds that specified for the cartridge, the excess length must be trimmed away from the open end, or neck, of the case. For decades many attempts were made to improve and simplify case trimming to prepare metallic cartridges for reloading. In the art of case trimming, the devices either held the case stationary and turned the trimmer, or turned the case against a stationary trimmer.

Most of the devices were of the type that held the case stationary and turned the trimmer. These often resulted in the case neck being trimmed at a slight angle if the case were not held precisely straight by the device. To reduce the tendency to cut crookedly, such devices usually included either a pilot inserted into the case neck or a cylindrical die for holding the case body. The correct size pilot or die for each caliber of case was needed. Advocates of this type of trimming device had recommended turning the case half a turn and re-cutting after an initial trim, to attempt to partially straighten a crooked cut.

When a device cut the case mouth at an angle, and a bullet seated in that case was fired, it was released from the case neck at a slight angle to the bore, and engaged the rifling crookedly, diminishing accuracy. If a crooked case neck were crimped to the bullet, the crimp would bear unevenly on the bullet, further reducing accuracy of the fired bullet.

Fewer devices were designed to turn the case against a stationary trimmer. Some cases had a head that was not quite square with the body of the case. This was typically found in salvage military, or other cases, which had been fired by autoloading firearms or those with a bolt face not exactly square with the chamber. When such a case was held by its head and turned, the runout observed was called "wobble".

Other causes of runout when a case was held by its head and turned were differences in the thickness of the brass case body or differences in annealing of the brass around the body. The thinner or softer side of the case stretched more on firing and contracted less on cooling than the thicker or harder side, resulting in a slight curve. Such cases were referred to as "banana" cases. Both wobble and banana were very small deviations from concentricity of a cartridge case and were not normally visible until a case was rotated by its head. Reloading press shell holders and resizing dies could only partially straighten such cases.

The effect of wobble and banana on trimmed cases was generally not found unless careful measurements of the mouth of the trimmed case were taken in several locations. Then the crooked mouth was found as a measureable difference from one side of the case to another.

Devices that held the case stationary either set case overall length correctly, from the head of the case, or from a less accurate datum on the shoulder of the case. This resulted in an incorrect case overall length if the resizing die set the shoulder at a different position than the specification for the cartridge. The user could adjust the trimmer and sizing die to meet the specification, but it was a tedious procedure that could spoil a few cases.

With some prior art devices the inside chamfering and outside deburring could also each be slightly crooked, decreasing the accuracy of fired bullets. The possibility of a crooked case mouth was greatly increased by those case preparation units having multiple tools revolving, where each case was brought to each spinning tool by hand. This inaccuracy was inherent to those devices because of the difficulty of manually bringing each case to a spinning tool precisely straight each time.

Prior art case preparation devices performed only one, or a few, of the steps required to trim and prepare cases for reloading, or took tedious adjustment, or produced inaccurate results. Many required each case to be repeatedly handled to perform each of the sequential steps. Most of the prior art devices were very fatiguing to operate if more than a few cases were prepared at one time. Shooters often wanted to prepare cases in batches of hundreds, so a solution was needed.

BRIEF SUMMARY OF THE INVENTION

The present embodiment comprises a bench top machine having an electric motor turning a case holder to turn a cartridge case against a trimmer and other tools affixed in a rotor. The rotor holds each tool substantially in line with the turning cartridge case, while a flexuous rod through the rotor permits alignment of each tool with the case axis. The tools are thereby able to trim, clean, and prepare cartridge case necks more squarely to the long axis of the case. Case overall length is set by a solid pilot pin which abuts the case holder preventing further trimming. Subsequent steps of chamfering, deburring, and simultaneously cleaning both the inside and outside of the freshly cut case neck are quickly performed on the same case. The embodiments presented mechanize the manipulation of case preparation tools by mounting them in a movable rotor, to bring each of the several case preparation tools sequentially to the neck of the turning case.

The case holder has an enlarged grip and is mounted in a chuck on a variable speed electric motor. The motor has a speed adjustment, and a pushbutton switch that can be pressed by hand, or set on the floor as a foot switch. The enlarged grip, besides facilitating installation and removal of cases, prevents the rotor from sliding off the rod. With the case holder grip removed, clearance between the end of the rod and the chuck allows a rotor to be slid off the end of the rod, to exchange it for a rotor fitted with the tools for a different cartridge case. Alternatively, individual tools can be exchanged on a rotor for different cartridge case calibers.

Cases turning in the case holder can also be conveniently wiped clean of case lubricant with a cloth, or polished with steel wool or an abrasive pad. Tools for cutting the crimp from the primer pocket of military cases, reaming the sides or bottom of the primer pocket, or cleaning the primer pocket, can be installed in the chuck and used for those operations on the head end of the case.

The foregoing and other objectives, features, and advantages of the cartridge case preparation rotor device will be more readily understood upon consideration of the following detailed description of the various embodiments, taken in conjunction with the drawing.

DETAILED DESCRIPTION OF THE INVENTION

Figure 1:
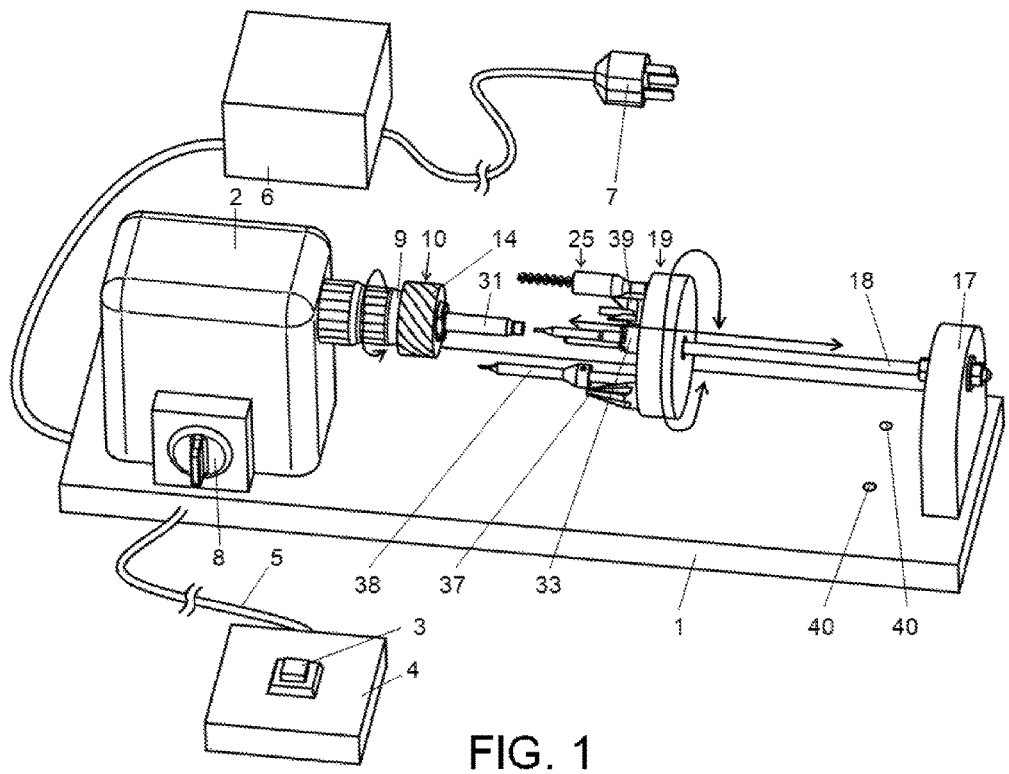
FIG. 1 is a perspective view of an embodiment of the case preparation rotor device.

One mode of making a cartridge case preparation rotor device begins with an elongate base 1, either solid or a frame structure (not shown), of wood, metal, plywood, plastic, or other suitable material, as shown in FIG. 1. An electric motor 2 is fastened to base 1, which is plywood in this embodiment, at one end. Motor 2 is a variable speed direct current motor of sufficient torque to perform the required case preparation operations, having a speed adjustment 8, and a power supply 6 with a cord and plug 7. A motor control switch 3 is a single pole, normally open, momentary push button in a housing 4, connected to an electrical cord 5 of sufficient length to be conveniently located for either manual or foot operation.

On the opposite end of base 1 from motor 2, FIG. 1, an upright rod support 17 of wood or other suitable material is mounted to base 1. A rod 18 of metal or other suitable material is fastened in support 17, protruding horizontally, parallel to base 1, and parallel to the axis of motor 2 shaft and chuck 9. In this embodiment, rod 18 is of polished cold rolled steel, approximately 6.35 mm (0.25 inch) diameter.

Rod 18 extends across base 1 for a sufficient length, for example 203 mm (8 inch) from support 17, to allow easy manipulation of a rotor 19 with cases and tools of various lengths, yet allow rotor 19 to be removed or installed on rod 18 when grip 14 is removed. The surface of rod 18 may be plated, coated, or polished and treated with a metal preservative to lubricate it and provide a slick bearing surface protected from corrosion. Rod 18 may be threaded on the end that passes through support 17 and held by a nut and lock washer on each side, or fastened by other suitable means. The center axis of rod 18 is offset below and behind the center axis of motor 2. The offset distance is the radius of the tools on rotor 19. Motor 2 and support 17 have sufficient height above base 1 to allow this offset and to permit rotor 19 to have sufficient clearance above base 1 to turn and slide freely on rod 18. Rod support 17 may be moved to another set of adjustment holes 40 closer to case holder 10 to accommodate shorter tools and cartridges.

Figure 2:
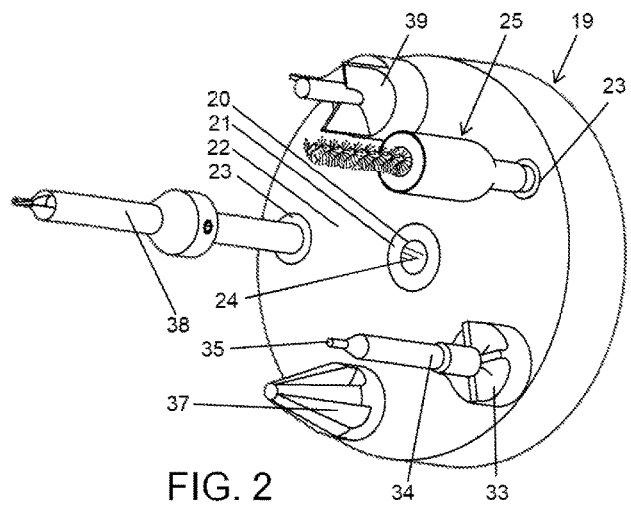
FIG. 2 is a perspective view of an embodiment of the rotor with exemplary cartridge case preparation and cleaning tools installed.

Rotor 19, FIG. 2, in this embodiment is a circular section of a cylinder, having a hole 20 through it on its center axis 24, hole 20 of such diameter to revolve and slide freely on rod 18, or hole 20 may be larger and fitted with a bushing 21 bearing of bronze, as in this embodiment, plastic, or other suitable bearing, to revolve and slide freely on rod 18. Rotor 19 in this embodiment is made of oak, but could be a plastic, resin, metal, or any other suitable material, or combination thereof. Rotor 19 of this embodiment has five holes centered on a circle on its front surface 22, and a threaded insert 23 is fastened into each hole for installing a case preparation tool. Rotor 19 of this embodiment is circular, but may be shapes other than round, particularly any regular or irregular polygon, cross, star, sphere, hemisphere, or other shape.

Each tool is positioned on rotor 19 such that the center of each tool is the same distance from and parallel to the center axis 24 of rotor 19. The tool center axes in the present embodiment are equidistant from one another, but the tools need not be equidistant for the device to operate. The tools are fastened on the front surface of rotor 19 at a right angle to the front surface of rotor 19. Such fastenings may be permanent, or preferably removable by threads, which may be cut, cast, molded, threaded inserts, or any other means suitable to resist torsion during the work. In this embodiment they are internally threaded size 8-32 metal inserts 23 held by epoxy adhesive (not shown). In the present embodiment, the tools are a case length trimmer tool 33, an inside chamfering tool 37, a flash hole deburring tool 38, an outside deburring tool 39, and an inside and outside case neck cleaning tool 25. The tools are commercially available, except for the inside and outside neck cleaning tool 25 of the rotor device.

To change the rotor device to prepare cases of a different caliber, the length pilot 34 is removable from trimmer 33 and another pilot 34 for the next caliber of case may be installed. Similarly, grip 14 can be unscrewed from stud 11 and replaced with one having the correct ring 12 to hold the head of the desired caliber cartridge case. Cleaning tool 25 may also be removed from rotor 19 and changed to one of the desired caliber. Flash hole tool 38 has a conical collar that can be adjusted for many different cartridge cases. Chamfering 37 and deburring 39 tools are each suitable to work on a wide range of cartridge cases.

Alternatively, a complete rotor 19 with tools installed for a different caliber may be exchanged on rod 18 for another rotor 19 by removing grip 14, sliding one rotor 19 off the end of rod 18 and sliding another rotor 19 on, and installing the appropriate grip 14. The rotor may be balanced by adding weight internally so that a preferred tool, such as trimmer 33, is at the beginning work position. The length of rod 18 is such that rotor 19 with installed tools will not come off the end of rod 18 easily unless grip 14 is first removed from stud 11 to provide adequate clearance.

Motor 2 output shaft has a three-jaw keyless chuck 9 or similar connecting means to connect the a case holder 10 to motor 2, in which is held commercial case holder 10, having a stud 11 onto which a ring 12 screws by mutually engaging threads 13. Ring 12 of case holder 10 is modified with a grip 14, FIG. 3, the grip being a flange of a diameter and thickness substantially greater than that of the ring 12 which it surrounds. The perimeter of grip 14 may be textured, smooth, knurled, checkered, or grooved to provide a more comfortable gripping surface for the user's fingers.

Figure 3:
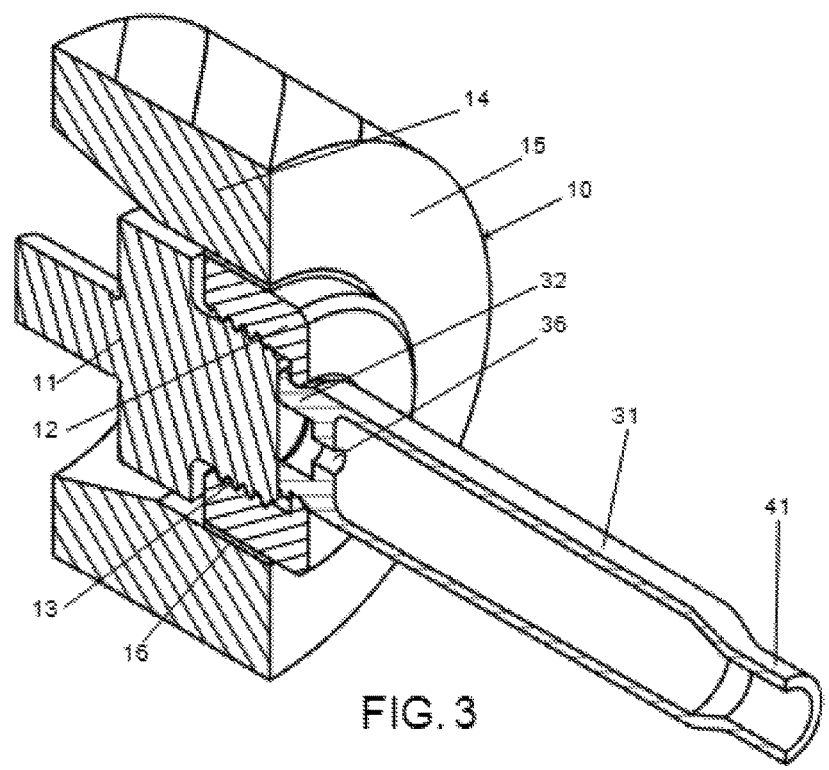
FIG. 3 is a perspective sectional view of an embodiment of the enlarged grip and case holder.

Grip 14, FIG. 3, may be made of wood, laminated wood, plastic, cast or machined metal, or other suitable materials or combinations thereof. Grip 14 may have an opening on one side (not shown) to allow the case head to be inserted into ring 12, or ring 12 may be fastened protruding from the front of grip 14, as in the present embodiment, whereby the front surface 15 of grip 14 provides a smooth entry for the head of the case into ring 12. The back of grip 14 has sufficient clearance to avoid interference with chuck 9. Grip 14 may be fastened onto ring 12 by epoxy 16 or other adhesive, press fit, setscrews, or other suitable means. Alternatively, grip 14 and ring 12 may be molded, cast, or machined as a single piece of metal, plastic or other suitable materials or combinations thereof, having threads to attach onto stud 11.

Figure 4:
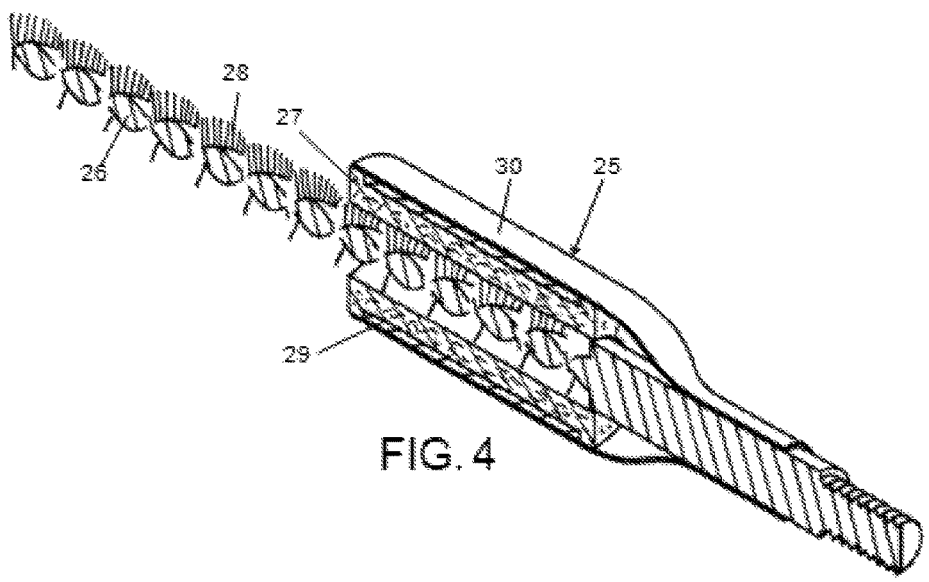
FIG. 4 is a perspective sectional view of an embodiment of the neck cleaner.

The inside and outside case neck cleaning tool 25, FIG. 4, is a bore brush 26 of the appropriate caliber, modified by having a layer of fibrous abrasive 27 wrapped over the basal portion of the bristles 28. Fibrous abrasive 27, nylon in this embodiment, or other suitable material, is held under tension by an elastic 29 layer, thereby forming a tube of fibrous abrasive 27. Elastic 29 layer may be a winding of rubber band or other suitable material, which is covered and protected by a cover 30 layer of durable material such as polyolefin heat shrink tubing, or other suitable material.

An appropriate length of the basal fibrous abrasive 27 tube for some smaller rifle cases is such that when the tip of bore brush 26 contacts the case head 32 inside of the case 31, fibrous abrasive 27 contacts the shoulder of case 31. Bore brushes that will not reach the head of case 31 are suitable for larger rifle cases, with one third to one half of the base of brush 26 covered by the three layers.

Use of an Embodiment of the Case Preparation Rotor Device

To use the rotor device of this embodiment to prepare cases for reloading, the rotor device base 1 is set on, or secured to, a table top or workbench, where the person operating the rotor device can work comfortably standing or, preferably, seated. Alternatively, a seated person could use the rotor device by holding it on the lap. Motor 2 power supply 6 is connected to electricity with plug 7. The control switch housing 4 is placed on the floor where control switch 3 can be pressed easily with a foot, or on the workbench to press control switch 3 with a finger.

A case 31 from the supply of resize cases to be trimmed and prepared is placed in ring 12 of case holder 10. Case holder 10 is tightened on case head 32 by grasping grip 14 with one hand and turning it in a clockwise direction to tighten, while holding chuck 9 with the other hand. Grip 14 simplifies applying adequate torque to ring 12 in installing case 31 into case holder 10 so that case 31 may be worked. Because case holder 10 rotates in the direction that tightens ring 12 on stud 11, grip 14 also simplifies applying adequate torque to remove the finished case.

Rotor 19 is manually rotated to bring a first tool into alignment with the case, typically case length trimmer 33, and case length trimmer pilot 34 is slid into the case, while at the same time case 31 may be started turning by pressing control switch 3. The offset of rod 18 gives the user the best view of the work by positioning the tool in use above and in front of the other tools. Motor 2 speed is easily increased or decreased by setting speed adjustment 8 to produce smooth, uniform cuts on the cases being trimmed. The case length trimmer 33 in rotor 19 is manually pressed against the neck 41 of case 31, trimming it shorter. When the end of pin 35 on pilot 34 protruding through flash hole 36 in case 31 touches stud 11, no further cutting is possible and the user withdraws trimmer 33 pilot 34.

The user withdraws trimmer 33 pilot 34 by sliding rotor 19 on rod 18 away from case 31, and the user turns rotor 19, seventy-two degrees when there are five tools installed in rotor 19 as in the present embodiment, to bring the next tool, for example inside chamfering tool 37, to case 31, while pressing control switch 3 to power motor 2. When case 31 is satisfactorily chamfered, the user slides and turns rotor 19 to bring the next tool to the case. For example, flash hole tool 38 could be used for uniforming and deburring flash hole 36 inside of cases being prepared, particularly once-fired military cases. Flash hole tool 38 is typically used only once in the life of the case, usually the first time a case is prepared to be reloaded.

Outside deburring tool 39 could be installed in the next position on rotor 19, and the user rotates deburring tool 39 into alignment and brings it to bear lightly on the turning case, and the outside deburring is accomplished. Chamfering 37 and deburring 39 tools are shorter than the other tools, yet the diameter of the circle whereupon the tools are installed on rotor 19 is large enough to provide clearance for the longer tools from case 31, grip 14, and chuck 9 during the operation of the shorter tools.

The user slides and rotates rotor 19 to bring cleaning tool 25 in line with case 31 and bore brush 26 is pushed into turning case 31 causing neck 41 to travel over bore brush 26 and into abrasive 27 tube until abrasive 27 touches the shoulder, whereupon cleaning tool 25 is withdrawn while case 31 is turning, to clean both the inside and outside of case neck 41. Elastic layer 29 brings nylon abrasive 27 into firm contact with the outside of case 31 neck 41. Brush 26 cleans the inside and fibrous abrasive 27 cleans the outside of case neck 41. Together, along with particles of brass that accumulate inside abrasive 27 tube, they lightly burnish the freshly cut neck 41 of case 31 to provide a smooth finish. Cleaning tool 25 operates with the rotor device to clean the neck for subsequent neck turning, if necessary, and for satisfactory bullet insertion.

The user releases control switch 3, cutting the power to motor 2, and when case holder 10 stops turning, removes case 31. The case 31 thus prepared is put with the prepared cases and the next case 31 to be prepared is fastened in case holder 10, and the procedures of length trimming, inside chamfering, flash hole deburring, outside deburring, and neck cleaning are repeated.

Further Features and Embodiments of the Rotor Device

Flexuous rod 18 is essentially rigid with respect to holding the weight of rotor 19 and installed tools, yet is sufficiently springy to flex slightly in use but not be permanently bent. Rod 18 can flex to permit each tool to align with cases which have a head not exactly square with the long axis of the case, or a slightly curved body, or partially or imperfectly straightened resized cases. A small amount of resilience between motor 2 and base 1 helps a tool in rotor 19 to align with a turning case 31. In addition to the flexibility of rod 18, rotor 19 can oscillate on rod 18 during use, which also contributes to alignment of each tool with an eccentric case by allowing the tool to follow the wobble.

Rod 18 may be bent at a ninety degree angle and the end of rod 18 fastened directly into base 1 by suitable means, thereby eliminating support 17, or base 1 may be formed with an integral support for rod 18. A right-handed rotor device embodiment is shown in FIG. 1, however; a left-handed version can easily be made by reversing the components on base 1. The present embodiment works well with most common sporting cartridges, however; the rotor device is easily scaled up for larger cartridge cases, or down for smaller ones.

Rod 18 may be another material having sufficient rigidity, durability, and modulus of elasticity, for example a carbon fiber composite, various plastics, metals, or other materials or combinations thereof, solid or tubular, to substitute for the steel rod. Rod 18 may be fluted and the interior of rotor 19 fitted with one or more spring loaded detents, to further aid positioning each tool in sequence in line with the case 31 being prepared. Rod 18 may be shapes other than round and rotor 19 rotatable on a bearing fitted to slide on the angular rod, or rotor 19 and an angular rod 18 could turn together on a bearing mounted in rod support 17. Rotor 19 may be fixed on rod 18 and rod 18 may slide and rotate in a bearing in rod support 17. The upright rod support 17, and the support for motor 2, may be of flexible material, or flexibly fastened, to allow alignment of the tools with the case being worked. In addition, or alternatively, the tools may be flexibly fastened in rotor 19. Rotor 19 may be made of multiple interlocking segments (not shown) to allow changing tools by removing one or more segments and installing a different segment fitted with a different tool.

In another contemplated embodiment (not shown), a cordless drill or cordless screwdriver could be substituted for motor 2, control switch 3, switch housing 4, power supply 6, speed adjustment 8 and associated electrical cords. In such an embodiment, a suitable support for the cordless tool would provide that the center axis of the cordless tool would coincide with the center axis of the several tools held in rotor 19 with the aforementioned offset of rod 18. Most persons already own a cordless drill or cordless screwdriver, and the cartridge case preparation rotor device would be portable to allow use in a location away from a power grid. Such an embodiment would lack the option of using control switch 3 as a foot switch, and would be limited by battery life.

As rotor 19 may be made for different numbers of tools than five, more or fewer tools may be used, to include a case neck 41 thickness cutting tool (not shown), for example. Case holder 10 can be removed from chuck 9 and various primer pocket cleaning or cutting tools (not shown) may be screwed into a threaded insert held in chuck 9, or chucked directly, and turned by motor 2 to perform the primer pocket preparation procedures conveniently.

In another embodiment (not shown) the rotor device adapts to progressive reloading presses. In such an embodiment, the press frame is the base structure. When case preparation tools are screwed into devices that fit into the shell case positions around the perimeter of the press ram shell plate, the progressive press shell holder becomes the rotor. The motor is flexibly mounted or with a flexible shaft, on the top of the press in a position ordinarily occupied by one of the dies, with the shaft passing down through the die holder of the press. The individual case preparation tools are positioned pointing up, in the rotor of this embodiment, on the rotating shell plate of the press. With the ram raised to use a shorter cartridge case preparation tool, the longer tools protrude into or through vacant positions in the progressive press die holder.

Holders to fasten case preparation tools to the progressive press ram shell holder plate could be modified case heads, or facsimiles thereof, having threaded inserts installed in their centers for accepting the threaded case preparation tools, and prevented from turning, while allowed to flex, by suitable means. Alternatively, the shell plate of the press may be replaced partially, or entirely, with a rotor holding the case preparation tools flexibly. In the progressive press embodiment, a case preparation tool would be advanced to the turning cartridge case sequentially with each stroke of the press, whereas in using a progressive press for reloading, the cases are advanced in sequence to each die station. In this embodiment, advancing and indexing the rotor mechanically is accomplished by the progressive press mechanism, in presses so equipped. In this embodiment, the turning case points down so brass cuttings fall free of the case being prepared.

Many enthusiastic shooters already own a progressive reloading press, and a kit (not shown), to fit such presses for use in case preparation could be offered as an alternative to the bench top rotor device. This embodiment would lack the automatic case feeding usually performed by a progressive press, as each case would be individually mounted into and removed from the case holder with the enlarged grip. The rotor device is also applicable to drill presses and miniature lathes.

In a further alternative embodiment (not shown), the rotor of case preparation tools could be advanced by a stepper motor or servomotor to position each tool. The rotor advanced by a motor could be arranged to bring the tools in sequence to the turning case. The rotor holding the tools could be designed as integral to a stepper motor.

In another contemplated embodiment (not shown), the case preparation tools could radiate outward around the perimeter of a rotor. The rotor circular motion could be separated from the linear motion by arranging an axle for the rotor to rotate on at a right angle to an attached tubular member to slide along the rod. Such a tubular member and rod could be square or other shapes. This embodiment may be advantageously combined with the previously disclosed motor rotor.

In yet further contemplated embodiments (not shown), multiple rods, for example three, fastened to a plate or frame pivoting on a bearing in the rod support could be used to allow the linear and rotary motion for a rotor device to prepare cases. A pivoting plate could have detents on its perimeter to aid in positioning the tools. In another embodiment (not shown), the rotor may be slanted on a rod or rods at an angle, and the tools fastened at that angle, with shorter tools on the side slanted toward, and longer tools on the side slanted away from, the turning case.

In additional embodiments (not shown), other tools designed to perform cartridge case preparation tasks, such as various case neck thickness trimming and turning tools, or inside reamers, can be mounted and used advantageously in a rotor, or on the rod, of a cartridge case preparation rotor device such as disclosed, and are within the scope of this disclosure.

Any other arrangements of gears, chains, sprockets, belts, or other means to turn and position a rotor holding a case preparation tool or tools mechanically, electrically, hydraulically, or manually, alone or in combination, or to hold the rotor by its perimeter and bring each case preparation tool to the turning case, or to bring a turning case to tools held in a rotor, may be contemplated by those with skill in the art, and are within the scope of this disclosure.

As various changes could be made in the above constructions and methods without departing from the scope of the invention, it is intended that all matter contained in the above description and shown in the drawings shall be interpreted as illustration and example, and not in a limiting sense. Having described how to make and use the cartridge case preparation rotor device in detail, including various embodiments and implications as examples, it is apparent that modifications and variations to one or more independent aspects of the invention are possible without departing from the scope of the invention. Further features and advantages of the invention are set forth in the following claims.

I claim:
1. A device for reconditioning used cartridge cases for reloading, comprising:
an elongate base having a first end and a second end;
an electric motor fastened to the base proximate the first end;

a case holder connected to an output shaft of the motor via a connecting means, wherein the case holder holds a cartridge case removably by its head;

a rod support mounted to the base proximate the second end;

a rod extending toward the case holder from the rod support, the rod being parallel to a longitudinal axis of the output shaft;

a rotor slidably and rotatably mounted on the rod via a central axial opening formed through the rotor;

the rotor having a first means for holding a cartridge case preparation tool, the first means for holding a cartridge case preparation tool being offset radially from the central axial opening;

the rotor having a second means for holding a cartridge case preparation tool, the second means for holding a cartridge case preparation tool being offset radially from the central axial opening;

wherein the rotor is configured to be manually rotated on the rod so as to alternatively and selectively align the first means for holding a cartridge case preparation tool and the second means for holding a cartridge case preparation tool with the cartridge case; and wherein the rotor is configured to be manually slid on the rod so as to bring a cartridge case preparation tool, held in either one of the first means for holding a cartridge case preparation tool and the second means for holding a cartridge case preparation tool with the cartridge case, into contact with the cartridge case while the motor automatically rotates the cartridge case, in order to perform a reconditioning step upon the cartridge case.

2. The device according to claim 1, wherein the cartridge case preparation tools are tools for preparing cartridge cases for reloading, and selected from the group consisting of cartridge case cutting, chamfering, deburring, shaving, reaming, and cleaning case preparation tools.

3. The device according to claim 1, wherein one of the cartridge case preparation tools comprises a means for simultaneously cleaning both the inside and the outside of a case neck.

4. The device according to claim 1, wherein the rotor is cylindrical; the first means for holding a cartridge case preparation tool is offset radially from the central axial opening of the rotor by a first distance; and the second means for holding a cartridge case preparation tool is offset radially from the central axial opening of the rotor by the first distance.

5. The device according to claim 1, wherein the rod is a flexuous rod.

6. The device according to claim 1, wherein the case holder comprises a grip portion about a perimeter thereof for manual gripping by a user.

* * * * *